United States Patent [19]

Wittman et al.

[11] Patent Number: 4,477,105
[45] Date of Patent: Oct. 16, 1984

[54] COLLET ACTUATED BALL AND SOCKET CONNECTOR

[75] Inventors: Robert H. Wittman; David E. Adkins; Arthur H. T. Chin, all of Houston, Tex.

[73] Assignee: Hughes Tool Company, Houston, Tex.

[21] Appl. No.: 611,374

[22] Filed: May 16, 1984

Related U.S. Application Data

[63] Continuation of Ser. No. 259,207, Apr. 30, 1981, abandoned.

[51] Int. Cl.³ .................................. F16L 27/06
[52] U.S. Cl. .......................... 285/18; 285/261; 285/320; 285/DIG. 21; 285/DIG. 18
[58] Field of Search ............ 285/261, 320, DIG. 21, 285/DIG. 18

[56] References Cited

U.S. PATENT DOCUMENTS

| | | | |
|---|---|---|---|
| 3,096,999 | 7/1963 | Ahlstone et al. | 285/DIG. 21 X |
| 3,997,197 | 12/1976 | Marsh et al. | 285/261 X |
| 4,040,650 | 8/1977 | Shotbolt | 285/261 X |
| 4,139,221 | 2/1979 | Shotbolt | 285/18 |
| 4,153,278 | 5/1979 | Ahlstone | 285/320 X |
| 4,180,285 | 12/1979 | Reneau | 285/261 |
| 4,195,865 | 4/1980 | Martin | 285/18 |
| 4,337,971 | 7/1982 | Kendrick | 285/320 X |
| 4,381,871 | 5/1983 | Dopyera et al. | 285/261 |

OTHER PUBLICATIONS

Subsea Pipeline Equipment and Systems, Cameron Collet Connectors, pp. 1, 6, 7.

Primary Examiner—Thomas F. Callaghan
Attorney, Agent, or Firm—Robert A. Felsman

[57] ABSTRACT

A collet actuated ball and socket connector for rigidly interconnecting the ends of two pipes is disclosed having a ball coupling member adapted for connection to the end of one of the pipes, and a retaining flange freely disposed about the ball coupling member and engaging the outer surface of the member. A socket coupling member adapted for connection to the end of the other of the two pipes is provided for accepting the ball coupling member and provides a metal sealing ring for mating with the ball members. A collet locking means is mounted about the outer periphery of the socket coupling member and extends generally axially therefrom for permitting insertion of the ball coupling member into mating engagement with the socket coupling member when the collet means is open. An actuating means applies a predetermined axial force to the collet locking means for closing the collet means to engage the retaining flange and lock the ball and socket coupling members together in a sealed, rigid relationship. The predetermined axial force applied by the actuating means is multiplied into a larger known force acting through said retaining flange-ball coupling member mating interface for creating a metal-to-metal seal between the ball and socket members and the sealing ring, and cooperates with the coefficient of friction between the mating surfaces to form a rigid connection.

18 Claims, 8 Drawing Figures

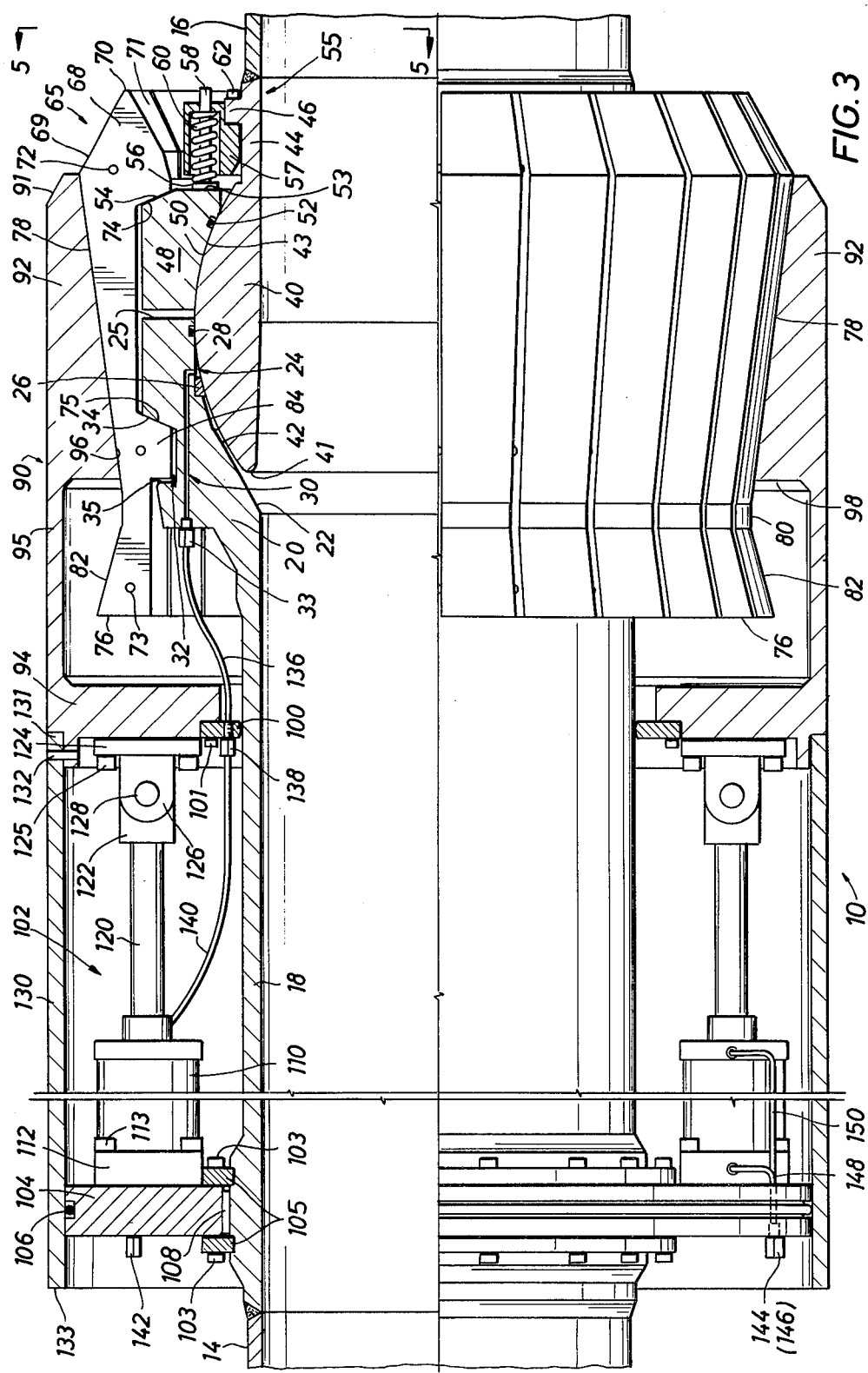

COLLET ACTUATED BALL AND SOCKET CONNECTOR

This is a continuation of application Ser. No. 06/259,207, filed Apr. 30, 1981 and now abandoned.

BACKGROUND OF THE INVENTION

1. Field of the Invention

This invention relates in general to subsea pipeline connectors, and in particular to a subsea pipeline or riser connector having a ball and socket joint that is engaged by a remotely actuated collet device.

2. Description of the Prior Art

Prior art ball and socket connectors are known in the art and provide a means of connecting adjacent pipe ends that are axially misaligned. However, when used as subsea connectors such prior art devices have generally been high-profile connectors that are cumbersome and difficult for pipe laying equipment to handle and generally must be mechanically assembled by divers on the ocean floor. In addition, it has been difficult to obtain connecting forces that have been sufficient to form metal-to-metal seals between the mating ends of the pipe and to retain the mating parts of the ball and socket joint in a rigid, non-swiveling condition.

The prior art also includes collet connectors for connecting abutting pipe ends in a straight end-to-end relationship but do not permit axial misalignment of the pipes. The prior art also discloses a combination of a ball and socket joint and a collet actuated clamping or locking mechanism. However, the combination device was not capable of generating sufficient clamping forces to form a metal-to-metal seal and to maintain the joint in a rigid condition.

The following U.S. patents are representative of the prior art: U.S. Pat. Nos. 4,139,221 (Shotbolt); 4,138,147 (Manchester, et al); 4,109,945 (Manchester, et al); 4,078,832 (Wittman); 4,045,054 (Arnold); 4,014,567 (Arnold, et al); 3,997,197 (Marsh, et al); 3,847,706 (Arnold); 3,830,526 (Mohr); and 3,598,429 (Arnold).

SUMMARY OF THE INVENTION

It is a general object of this invention to provide a collet actuated ball and socket connector that permits connecting two pipes which have a limited degree of axial misalignment.

It is another object of this invention to provide a collet actuated ball and socket connector that provides sufficient locking forces to create a metal-to-metal seal and to maintain the joint in a rigid condition.

It is yet another object of this invention to provide a collet actuated ball and socket connector that includes means for providing a high amplification of the collect actuating forces that are transmitted to the ball and socket joint.

It is a further object of this invention to provide a collet actuated ball and socket connector having a hydraulically actuated collet means that may be remotely operated in a subsea environment without diver assistance.

In accordance with these objects, a collet actuated ball and socket connector for rigidly interconnecting the ends of two pipes is provided, having a ball coupling member adapted for connection to the end of one of the pipes, and a retaining flange freely disposed about the ball coupling member for engaging the rearwardly facing spherical outer surface of the ball coupling member. A socket coupling member adapted for connection to the end of the other of the two pipes is provided for accepting the ball coupling member. A collet means is mounted about the outer periphery of the socket coupling member and extends generally axially therefrom for permitting insertion of the ball coupling member into mating engagement with the socket coupling member when the collet means is open. A remotely controlled actuating means mounted on the socket coupling member applies an axially directed force for closing the collet means to engage the retaining flange and lock the ball and socket coupling members together in a sealed, rigid relationship.

The ball coupling member has a free end that terminates in a ball-shaped portion defining concentric forward and rearward facing spherical outer surface portions, and the retaining flange has a spherical internal surface portion for mating engagement with the rearward facing spherical outer surface portion of the ball coupling member. The socket-shaped portion of the socket coupling member carries a metal sealing ring disposed in an annular recess for sealingly mating with the forwardly facing spherical outer surface portion of the ball coupling member.

The collet means includes a plurality of elongated collet locking members disposed about the periphery of the socket coupling member and adapted for limited pivotal movement in a radial plane with respect thereto. A collet actuating sleeve is disposed about the plurality of collet locking members and adapted for axial sliding movement with respect to the members and the socket coupling member. The actuating means may comprise a plurality of hydraulic cylinders peripherally disposed about the socket coupling member and adapted for applying a predetermined axial force to the collet actuating sleeve for pivotally closing the collet members and engaging the retaining flange. The engagement of the locking sleeve, collet members and retaining flange multiplies the predetermined axially applied force into a known force applied to the rearwardly facing spherical outer surface portion of the ball coupling member for driving the forwardly facing spherical outer surface portion of the ball coupling member into contact with the metal sealing ring with sufficient force to cause sealing deformation of the metal sealing ring against the forwardly facing spherical outer surface portion of the ball. The known force applied to the rearwardly facing spherical outer surface portion of the ball portion also cooperates with the coefficient of friction between the retainer flange and the spherical outer ball surface for generating frictional forces sufficient to lock the ball and socket coupling members together to prevent relative motion therebetween and to maintain a rigid connection.

BRIEF DESCRIPTION OF THE DRAWINGS

FIG. 3 is a combination elevation (partially cut away) and vertical axial cross-sectional view of the collet actuated ball and socket connector, showing the collet locking means closed for securing and sealing the ball and socket joint.

DESCRIPTION OF THE PREFERRED EMBODIMENTS

Figure 1:
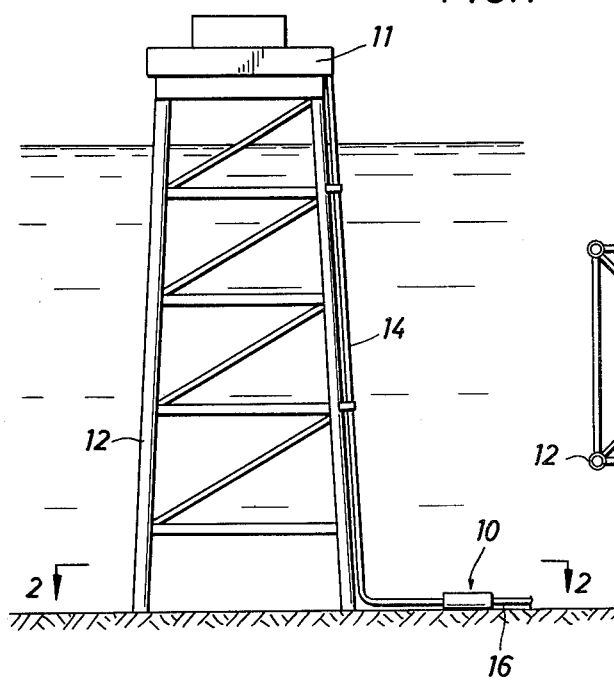
FIG. 1 is a vertical schematic view of the collet actuated ball and socket connector of this invention shown in a position for connecting two pipe ends.
Figure 2:
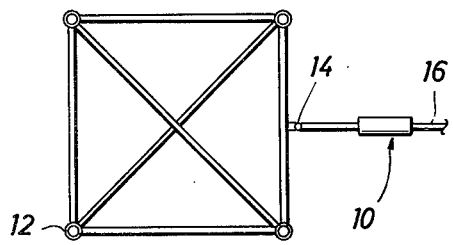
FIG. 2 is horizontal schematic view of the collet actuated ball and socket connector of this invention as shown in FIG. 1 and taken along lines 2—2 of FIG. 1.
Figure 5:
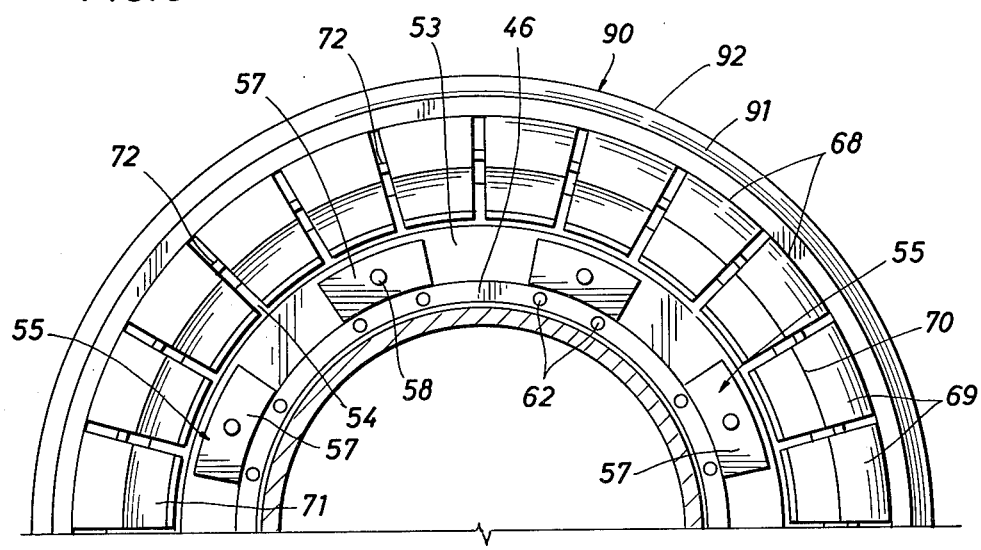
FIG. 5 is a partial vertical cross-sectional view of the connector shown in FIG. 3 and taken along lines 5—5 of FIG. 3, showing the collet locking means closed.

Referring to FIGS. 1 and 2, an offshore oil or gas drilling and/or production platform 11 supported on the ocean floor by rig structure 12 is shown wherein pipeline 16 is shown interconnected to a pipeline riser section 14, structurally mounted on rig 12, by means of the collet actuated ball and socket connector 10 according to this invention. Connector 10 is designed to be remotely operated to join two pipe ends, such as the ends of pipes 14 and 16 in a subsea environment, particularly at depths where it is impractical or impossible to use divers for physically making the connection. Connector 10 will accommodate a limited degree of misalignment of the respective pipe ends.

Figure 4:
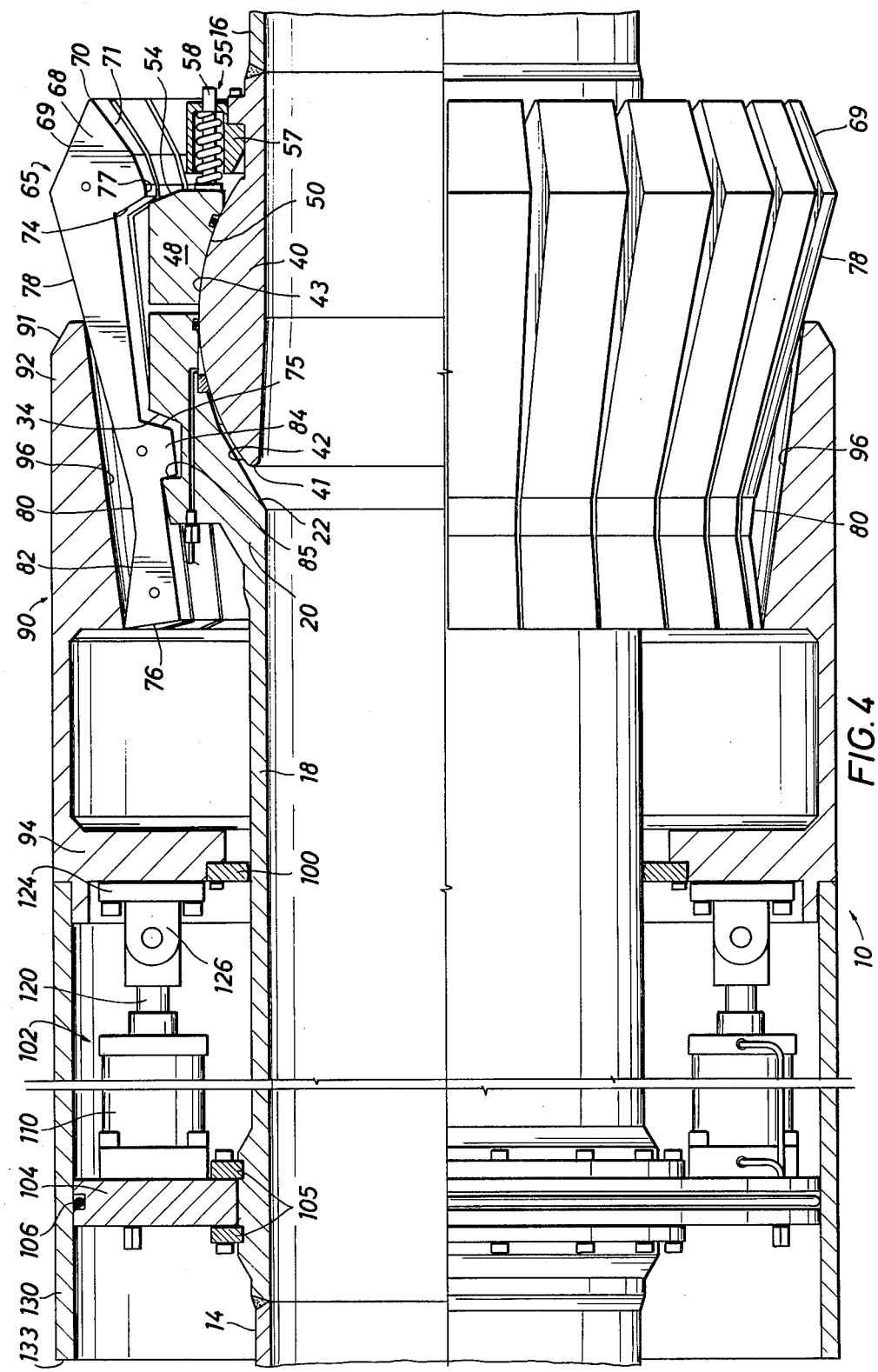
FIG. 4 is a combination elevation (partially cut away) and vertical axial cross-sectional view of the collet actuated ball and socket connector, showing the collet locking means open for accepting the ball member.

The collet actuated ball and socket connector 10 is shown in FIGS. 3, 4, 5 and 6 in greater detail. In FIG. 4 the connector 10 is shown in the "open" or "unlocked" condition and in FIGS. 3, 5 and 6, details of the connector in the "closed" or "locked" condition are shown. A socket coupling member 20 is connected to pipe 14 by a pipe extension section 18 butt welded to the end of pipe 14 as shown. Socket coupling member 20 has an internally machined cavity and socket forming surface 22 for accepting the ball coupling member 40 as will as hereinafter described in greater detail. An inner annular groove or recess 24 is provided in socket 20 for providing a seating recess for a metal sealing ring 26. Disposed adjacent the forward extending end of socket 20 and communicating with inner surface 22 is an elastomeric O-ring seal 28. A plurality of passageways or holes 30, peripherally spaced about socket coupling means 20, open at one end into the recess or groove 24 (between the metal sealing ring 26 and the O-ring seal 28) and at the other end are connected to inlet port connectors 33 for receiving pressurized fluid through tubing 136 for purposes to be hereinafter further described.

The collet locking means 90 includes the collet locking members 68 and the collet actuating sleeve 95. The plurality of elongated collet locking members 68 are disposed about the outer periphery of socket 20 in a closely spaced relationship to form a ring-like collet assembly 65. Each collet locking member 68 has a generally inverse trapezoidal or truncated wedge-shaped cross-section to permit the plurality of members 68 to be closely spaced for forming the ring-like collet assembly 65. Small spacers 72 and 73 are attached to one side of each member 68 and project therefrom to engage and space the adjacent member 68.

Each member 68 has a radially inwardly projecting lug 84 that is disposed in and engages an annular recess or groove 32 disposed in the outer periphery of socket coupling member 20. The engagement of lug 84 in groove 32 provides a means of pivoting collet locking members 68 in a radial plane with respect to socket member 20 as will be hereinafter further described.

Each collet locking member 68 has an extending end 70 projecting forwardly of the socket coupling member 20 to engage the ball coupling member 40 as will be hereinafter described in detail. The forwardly extending end 70 of member 68 is generally wedge-shaped with an outer inclined surface 69 and an inner inclined surface 71. An inwardly disposed inclined shoulder 74 is provided for engaging the retaining flange 48 as will be hereinafter described. The other end 76 of member 68 projects rearwardly of socket 20. The outer surface of collet locking member 68 is saddleshaped and has a pair of inwardly inclined camming surfaces 78 and 82 that merge at surface 80. The camming surfaces 78 and 82 cooperate with the collet locking ring or sleeve 95 to close and open the collet assembly 65 as will be hereinafter described in greater detail.

The ball coupling member 40 has an extending pipe section 44 for butt welding to pipe 16 as shown. The ball-shaped portion of ball coupling member 40 has forwardly and rearwardly facing outer spherical portions 42 and 43, respectively. A retaining flange 48 is disposed about the ball 40 and has a spherical internal surface 50 for mating engagement with the rearward facing spherical outer surface 43 of ball 40. Flange 48 has a rearwardly facing annular surface 53 and a rearwardly facing inclined shoulder 54. An elastomeric bearing ring 52 is disposed in a groove in surface 50 for engaging the surface 43 of ball 40.

Retaining flange 48 is free to initially swivel and rotate about the mating surface 43 of ball 40 until the collet locking means 90 is closed. However, to retain flange 48 in contact with ball 40 and to prevent the flange from sliding rearwardly away from the ball 40 toward pipe 16 during handling, a flange retaining means is mounted on the ball coupling member 40 to maintain flange 48 in initial concentric, rotational engagement with ball 40. The flange retaining means may conveniently take the form of a plurality of spring assemblies 55 mounted in a spaced relationship about the outer periphery of pipe extension section 44.

Pipe extension section 44 has disposed thereabout a radially projecting annular flange 46 to which a plurality of spring housing members 57 are removably attached by fastening means such as cap screws 62. Housing 57 has an internal bore carrying a spring 60 and a spring guide 58 concentrically disposed therethrough with an enlarged pad end 56 for engaging the rearward facing surface 53 of the retaining flange 48. The spring assemblies 55 retain flange 48 in concentric engagement with the rear facing surface 43 of ball 40 during the coupling procedure. Spring retaining assemblies 55 also permit rotational sliding movement and a limited degree of swiveling movement of flange 48 with respect to ball 40, while maintaining flange 48 in a generally centered concentric position on ball 40.

As the ball coupling member 40 is stabbed into the socket coupling member 20, the open pivoted collet locking members 68 form a funnel to engage and guide the nose or extending end 41 of ball 40 into the socket 20 and general mating engagement with the inner socket surface 22. However, it is not necessary that the inner socket surface 22, rearwardly of sealing ring 26, physically mate with the forward facing spherical surface portion 42 of ball 40, and can be bored slightly larger than the forward end 42 of ball 40. The inner socket surface 22 forward of the sealing ring recess 24 may be machined to have a spherical surface for mating engagement with the forward spherical surface portion 42 of ball 40. It may be desirable that the above described inner socket surface 22 forward of the recess 24 have a spherical diameter slightly smaller than the diameter of the forward facing spherical surface 42 of ball 40 for creating a wedge tight fit with the ball surface 42.

Collet locking sleeve 95 is concentrically disposed about the ring-like collet assembly 65 in sliding contact with the outer inclined surfaces 82 and 78 of the plurality of collet locking members 68. The forward end of sleeve 95 has a ramp or wedge-shaped cam portion 92 and a rearward end having an integral inward radially projecting annular flange 94. A bearing ring 100 is concentrically disposed about the pipe extension section 18 of the socket coupling member and attached to the lower depending surface of flange 94 by conventional means such as screws 101. Bearing ring 100 supports the rear extending end 94 of sleeve 95 concentrically about pipe extension section 18 and forms a bearing surface between sleeve 95 and section 18 to permit sliding axial movement therebetween.

A remote controlled actuating means 102 is mounted on pipe section 18 rearwardly of collet locking sleeve 95. Actuating means 102 may conveniently take the form of a plurality of hydraulic cylinders 110 peripherally spaced about pipe extension section 18 and radially spaced therefrom and in a parallel axial relationship thereto. The base 112 of cylinders 110 is attached to a mounting ring 104 by means of fasteners such as screws 113. The mounting ring 104 is concentrically attached to pipe extension section 18 by means of a pair of locking rings 105 disposed in a pair of spaced annular channels formed in pipe extension section 18 and attached to the mounting ring by conventional fasteners such as screws 103. A key 108 is disposed between ring 104 and section 18 to prevent relative rotational motion therebetween.

Each cylinder actuating rod 120 has a rod eye 122 attached to its extending end. Rod eye 122 is secured in a clevis bracket 126 by means of a pivot pin 128. The clevis bracket base 124 is mounted on the rear facing surface of the flanged end 94 of the collet actuating sleeve by any suitable attachment means, such as screws 125. An outer cylindrical shell 130 is concentrically disposed about pipe extension section 18 and the actuating means 102. The forward end 131 of shell 130 is attached to the rearwardly extending end 94 of sleeve 95 by means of a plurality of radially inserted pins 132. The other end 133 of shell 130 projects rearwardly of mounting ring 104. A plastic bearing ring 106 is disposed in the radially projecting outer surface of mounting ring 104 to contact the inner surface of shell 130 and provide a low friction bearing surface when shell 130 slides axially with respect to mounting ring 104 with the collet actuating sleeve 95.

Connector 33 is connected to an external hydraulic connector 142, mounted on the rearwardly facing surface of mounting ring 104, through hydraulic lines 136 and 140, and connector 138. A pair of external hydraulic connectors 144 and 146 are also mounted on the rearwardly facing surface of mounting ring 104 adjacent cylinders 110 to provide hydraulic fluid through lines 148 and 150 for actuating the cylinders 110 and extending and retracting the actuating rod 120, respectively. A remotely controlled source of hydraulic fluid (not shown) may be interconnected to connectors 142, 144 and 146 by flexible hoses or tubing for operating the collet actuated ball and socket connector 10 in its subsea environment.

Referring to FIGS. 3, 4, 5 and 6 the actuating sequence for closing and locking the collet assembly 65 for sealing and rigidly interconnecting the ball and socket joint will now be explained in greater detail. The socket coupling member 20 is connected by pipe extension section 18 to the end of pipe 14, and ball coupling member 40 is connected by means of pipe extension section 44 to another pipe 16, as previously described. The collet assembly 65 is actuated to an open position in order to remove a shipping plug (not shown) by applying hydraulic fluid from a remote source (not shown) through connectors 146 and tubing 150 to cylinder 110 to retract rods 120 for axially moving the collet locking sleeve 95 to its rearmost position as shown in FIG. 4. When the collet actuating sleeve 95 is moved to its maximum rearward position the inclined inner surface 96 of the wedge-shaped cam end 92 slides axially rearward and disengages surface 96 from the ramp-shaped outer surface 78 of the collet locking members 68. Surface 96 then slides over intermediate surface 80 and engages the outwardly and rearwardly ramped surface 82, thus camming collet member end 76 inwardly.

As end 76 is cammed inwardly, end 70 of collet locking members 68 are pivoted outwardly, with lug 84 engaging channel 32 (acting as a fulcrum) to "open" members 68 for accepting ball member 40, as shown in FIG. 4. The surface 96 adjacent the forward wedge-shaped cam section 92 of sleeve 95 engages the outer inclined surface 78 of collet locking members 68 for limiting the outward radial pivoting movement of the collet members 68. Members 68 are positioned wide enough for defining an entry diameter between the depending surfaces 77 of oppositely spaced collet members 68 just slightly larger than the diameter of the retaining flange 48. The "open" collet assembly 65 forms a funnel for engaging and guiding the ball coupling member 40 into socket member 20.

As the ball coupling member 40 is stabbed toward the socket coupling member 20, the forward end 41 and spherical portion 42 will be guided into the socket cavity 22 by engaging the inwardly tapering surfaces 71 of the collet assembly 65 and then the inner surface 22 adjacent socket end 25. The ball forward end 41 will continue moving into socket 20 until the forward spherical portion 42 of ball 40 engages the metal sealing ring 26 and the inner surface 22 of socket 20 between the sealing ring recess 24 and socket end 25. The engagement of the ball and socket coupling members (40 and 20, respectively) permit a limited degree of misalignment between pipes 14 and 16, as will be further explained. Retaining flange 48 is positioned adjacent end 25 of socket 20 and within the open collet assembly 65. The collet assembly is now ready to be "closed" or "locked" to complete the joint connection, and the closing and sealing action will be described with particular reference to FIGS. 3, 5 and 6.

To close collet locking assembly 65, hydraulic fluid from a remote source (not shown) applies pressurized hydraulic fluid through connector 144 and tubing 148 to hydraulic cylinders 110 for extending actuating rod 120 as shown in FIG. 3. As rods 120 are axially extended, a predetermined actuating force is provided by the cylinders 110 of the actuating means 102 and transmitted to the attached collet actuating sleeve 95. The predetermined actuating force axially applied to sleeve 95 moves the sleeve axially forward over the outer surfaces 78 of the members 68 of the collet assembly 65. The forwardly moving end 91 of sleeve 95 engages the outer surfaces 78 of members 68 for camming the upwardly extending ends 70 of members 68 inwardly. Members 68 pivot about lugs 84 in channel 32 until the forwardly inclined shoulder 74 of the locking lug end 70 of members 68 engages the retaining flange rearwardly inclined shoulder 54 for centering flange 48. Flange 48 will be centered by the engagement with collet locking members 68 to accommodate misalignment of pipes 14 and 16, since flange 48 is free to slide with respect to the ball surface 43. Further forward axial movement of sleeve 95 causes the entire inner surface 96 of the cam end 92 of sleeve 95 to frictionally engage the entire outer surface 78 of the collet members 68 for camming the collet members inwardly until shoulder 75 of the collet member lug 84 engages the forward shoulder 34 of channel 32.

Figure 6:
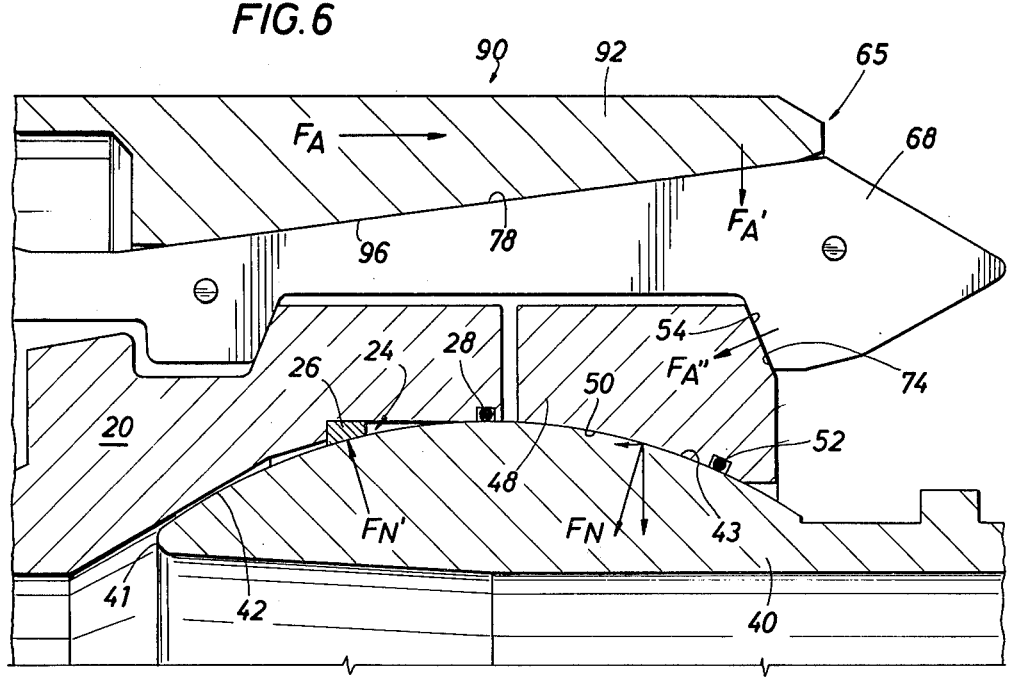
FIG. 6 is a partial vertical cross-sectional view of the ball and socket coupling members, retaining flange, collet locking members and collet actuating sleeve shown in the closed position.

Continued application of the predetermined actuating force ($F_A$) (See FIG. 6) in an axial forward direction by sleeve 95, acting through cam end portion 92 and in response to the geometry of the frictionally engaged mating surfaces 96 and 78, will result in a known radially acting multiplied actuating force ($F_{A'}$) being applied through the collet locking members 68 (see FIGS. 3 and 6). The radial actuating force ($F_{A'}$) acting through members 68 will be applied as a known multiplied actuating force ($F_{A''}$) acting through the engaged mating shoulders 74 and 54 of collet members 68 and retaining flange 48, respectively, generally inwardly through retaining flange 48. Force ($F_{A''}$) is applied generally through the inner spherical surface 50 of flange 48 to the frictionally engaged rearwardly facing spherical surface 43 of ball 40 where it is transmitted into ball 40 as a multiplied force ($F_N$) acting normally (radially) inward from surface 43. The normal force ($F_N$) is transmitted forwardly through ball 40 and then applied to the surface of the metal sealing ring 26 as another known multiplied force ($F_{N'}$) in a direction normal to interface between the ball forwardly facing spherical surface 42 and the sealing ring 26.

With a predetermined axial actuating force $F_A$ applied through locking sleeve camming end 92, and by carefully controlling the geometry of the interface or engaging surfaces 96 and 78 between the sleeve 95 and collet members 68, respectively; between surfaces 74 and 54 between collet member 68 and retaining flange 48, respectively; between flange surface 50 and ball spherical surface 43; and between ball surface 42 and sealing ring 26, the force ($F_{N'}$) applied to the metal sealing ring 26 by the forwardly facing spherical surface portion 42 of ball 40 can be predictably controlled because of the multiplication of force $F_A$ through each of the above described interfaces. Thus a high multiplication factor, 50× or 100× or greater can be achieved.

The known normal force ($F_{N'}$) applied to metal sealing ring 26 is sufficient to cause plastic deformation of the metal sealing ring against the spherical surface 42 of ball 40 to effect a positive metal-to-metal seal therebetween. The surface 42 of ball 40 also frictionally engages the inner socket surface 22 forward of the sealing ring recess 24 and engages the O-ring 28 disposed in the forward end of socket 20.

The actuating force ($F_{A''}$) applied through retaining flange 48 is applied as hereinabove described as a normal force ($F_N$) (see FIG. 6) acting radially inwardly over the entire mating spherical metal-to-metal frictionally engaged surfaces 50 and 43. Normal steel-to-steel coefficients of friction will run about 0.15 to 0.25, however, to obtain a rigid ball and socket connection, without having to greatly increase the mating engaged surface area defined by surfaces 50 and 43, it is desirable to increase the coefficient of friction substantially. This may be accomplished by roughening the spherical mating surfaces 50 and 43. One preferred method is to utilize a flame sprayed powder consisting of stainless steel and tungsten carbide applied to either or both engaging surfaces 50 and 43. Such a product is commercially marketed by Wall Colmonoy Corporation under its trademark COLMONOY and can increase the coefficient of friction between the mating engaged surfaces 50 and 43 to 0.4 or greater. With the increased coefficient of friction, the normal forces ($F_N$) cooperating with the coefficient of friction between retaining flange 48 and ball 40 can provide a restraining force acting on ball 40 sufficient to rigidly hold the ball coupling member 40 in sealing engagement with the socket coupling member 20.

The angle of engagement between sleeve surface 96 and collet locking members surface 78 is sufficient to make the collet assembly 65 self-locking. In addition, the degree of misalignment between pipes 14 and 16 permitted by connector 10 is governed by the clearance between surfaces 71 and 77 of collet members 68 and the spring retaining assemblies 55. The misalignment capability must be in excess of ±1°.

Once the collet locking means 95 has been actuated to the locked position for applying sealing forces to establish a metal-to-metal seal between ball coupling member 20 as hereinabove described, the seal may be tested by applying hydraulic fluid from a remote source (not shown) through connectors 142, 138 and 33, and tubing 140 and 136 to hole 30 and into the sealing ring recess 24. The pressurized fluid fills the space between the metal-to-metal sealing interface between sealing ring 26 and surface 42 of ball 40 and the sealing interface between O-ring 28 and ball surface 42 to detect leakage past either the metal-to-metal seal with sealing ring 26 or the O-ring 28. If properly sealed, ball 40 will always exert sufficient pressure on sealing ring 26 to make the metal-to-metal seal unless the forward facing surface 42 of ball 40 has been damaged during the pipe laying or coupling operations. Scoring and other damage to ball surface 42 may compromise the integrity of the seal, however, the testing procedure above described will timely determine the seal effectiveness in order that the coupling 10 may be replaced or repaired immediately. If the seal tests positively, then the connector 10 may be permanently locked in position, if desired, by the injection of liquid epoxy resin into cylinders 110 through connectors 144, and also into the cavity between seal 26 and O-ring 28 and ball surface 42, and allowed to set.

One fail-safe feature of the present invention includes the grouping of the plurality of hydraulic cylinders 110 into two groups, each operated independently of the other through separate common hydraulic lines. Ordinarily, both groups of cylinders 110 will be actuated to open and close the collet locking means. However, each group of cylinders has been sized to be able to provide the necessary predetermined force ($F_A$) to set the collet locking means and achieve the metal-to-metal seal and rigid connection, even if the other group malfunctions. Since the cylinders of each group are alternately spaced, each group of cylinders can provide the necessary actuating force ($F_A$) evenly distributed about the collet sleeve 95. Similarly, one group of cylinders 110 will be sufficient to unlock the collet locking means 90.

Figure 7A:
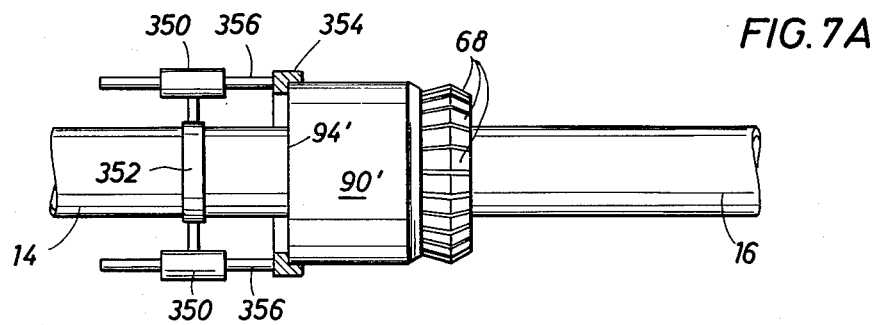
FIGS. 7A & 7B are schematic elevation views showing a removable external mechanical means for actuating a modified embodiment of the collet actuated ball and socket connector of the present invention.
Figure 7B:
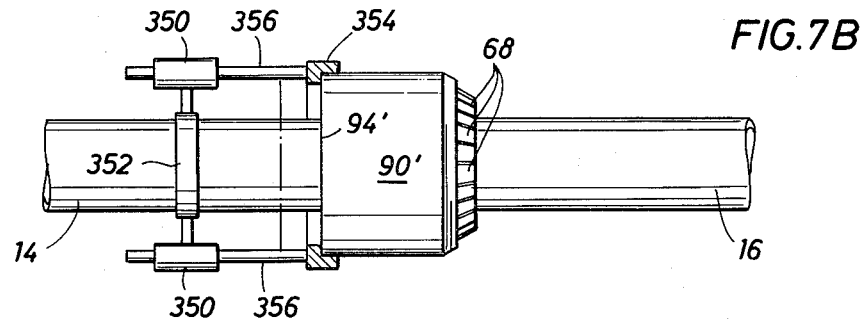

In another embodiment, the actuating means 102 may be a separate detachable unit from the coupling member 20 and the collet locking means 90. The collet locking means 90' would include the assemblies above described and would function in an identical manner to "open" and "close" the collet assembly 65. However, the actuating means 102 could be a separate detachable actuating means that would only be used to lock and unlock collet locking means 90 and then be removable to be used to set another connector. such an embodiment is shown in FIGS. 7A and 7B.

A suitable conventional actuating or force applying means such as a plurality of rams or jacks 350 (or cylinders 110) may be removably mounted by means of a collar device 352 to pipe 14 rearwardly of the connector 10 and adjacent the rearwardly extending face 94' of the sleeve 95 (see FIGS. 3 and 4). An engaging means 354 is attached to the ram or jack actuating rods 356 and moved axially into engagement with sleeve 95 of collet locking means 90'. Rams or jacks 350 are then remotely operated to provide a predetermined axial force applied to the sleeve 95 of means 90'. The force applied to sleeve 95 axially drives the collet locking sleeve 95 forwardly over the plurality of collet locking members 68 for camming the collet assembly 65 (see FIGS. 3 and 4) to a closed position and engaging the retaining flange 48 (see FIGS. 3 and 4) to lock the ball and socket connector as hereinabove described. The actuating means would then be removed from pipe 14 for reuse.

While the invention has been shown in a plurality of its forms, it should be apparent to those skilled in the art that it is not so limited but is susceptible to various changes and modifications without departing from the spirit thereof.

We claim:

1. A remotely operable collect actuated ball and socket connector for rigidly interconnecting the ends of two pipes, comprising:
   a ball coupling member adapted for connection at one end thereof to the end of one of the pipes and having a free end thereof that terminates in a ball-shaped portion defining concentric forward and rearward facing spherical outer surface portions,
   a retaining flange freely disposed about said ball coupling member and having a spherical internal surface portion for mating engagement with said rearward facing spherical outer surface portion of said ball-shaped coupling member, the rearward end portion of said flange having an inclined shoulder on the rearward edge facing outwardly from said ball coupling member,
   flange retaining means mounted on said ball coupling member for maintaining said retaining flange in initial concentric and rotating mating engagement with said ball-shaped coupling member,
   a socket coupling member including a cylindrical pipe extension section adapted for connection at one end thereof to the end of the other of the two pipes and having a free end thereof that terminates in a socket-shaped portion for accepting the ball-shaped coupling member in general mating engagement therewith,
   a metal sealing ring disposed in an annular recess within said socket-shaped portion of said socket coupling member for sealingly mating with said forwardly facing spherical outer surface portion of said ball coupling member,
   collet locking means mounted about the outer periphery of said socket coupling member and extending axially forward therefrom for permitting insertion of said ball coupling member and retaining flange into mating engagement with said socket coupling member when said collet locking means is open, and engaging said inclined shoulder of said retaining flange for securing said flange and mating ball member in said socket member when said collect locking means is closed to permit a limited degree of axial misalignment between the two pipes, and
   actuating means cooperating with said collet locking means for applying a predetermined axial force thereto for closing said collet locking means and multiplying said predetermined axial force applied through said collet locking means and said retaining flange into a known force applied to said rearwardly facing spherical outer surface portion of said ball coupling member for further multiplying said known force and driving said forwardly facing spherical outer surface portion of said ball coupling member into contact with said metal sealing ring to cause sealing deformation thereof against said ball coupling member, said known force applied between said retaining flange and said rearwardly facing spherical outer surface portion of said ball member also cooperating with the coefficient of friction therebetween for generating frictional forces sufficient to lock said ball coupling member rigidly into said socket coupling member for preventing relative motion therebetween.

2. The connector as claimed in claim 1, wherein said collet locking means comprises:
   a plurality of elongated collet locking members having a generally inverse trapezoidal-shaped cross-section and distributed in a closely-spaced relationship about the outer periphery of said socket coupling member to form a ring-like collet assembly, each of said collet locking members cooperating with said socket coupling member for permitting limited pivotal movement of said collet locking members with respect to said socket coupling member, the forward extending end of each of said collet locking members having an inwardly facing inclined shoulder for mating engagement with said outwardly facing inclined shoulder of said retaining flange when said collet locking members are pivoted to a closed position, and
   a collet actuating sleeve disposed about and engaging said ring-like assembly of collet locking members and adapted for limited axial sliding movement with respect thereto, said sleeve having a forward end portion having a generally wedge-shaped axial cross-section for cooperating with the outer surface of said plurality of collet locking members for camming said members pivotally inward to a closed position when said sleeve is moved axially toward the forward extending ends of said collet locking members and pivoting said collet locking members outward to an open position when said sleeve is moved axially rearward with respect to said collet locking members.

3. The connector as claimed in claim 2, wherein said collet locking members further comprise a radially inwardly projecting lug engaging an annular recess disposed about the outer periphery of said socket coupling member and cooperating therewith for permitting said limited pivotal movement of said collet locking members with respect to said socket coupling member.

4. The connector as claimed in claim 2, wherein the mating interfaces between said collet actuating sleeve and the outer surface of said collet locking members, said collet locking members forwardly facing inclined shoulder and the retaining flange rearwardly facing inclined shoulder, said retaining flange inner spherical surface and the rearwardly facing spherical surface of the ball member, and said ball member forwardly facing spherical surface and the metal sealing ring cooperate to multiply said predetermined axial actuating force into said known force capable of effecting said metal-to-metal seal and rigidly locking said ball member with respect to said coupling member.

5. The connector as claimed in claim 2, wherein said mating surfaces of said ball coupling member and said retaining flange are treated to increase the coefficient of friction therebetween.

6. The connector as claimed in claim 2, wherein said actuating means comprises:
a plurality of hydraulic cylinders adapted for remote control operation and circumferential mounting in a spaced parallel axial relationship about said pipe extension section of said socket coupling member, the actuating rods of said plurality of hydraulic cylinders engaging said collet actuating sleeve for applying a predetermined axial force to said sleeve when said hydraulic cylinders are actuated for axially moving said sleeve forward with respect to said plurality of locking members.

7. The connector as claimed in claim 6, further comprising an annular ring fixed concentrically to said pipe extension section of said socket coupling member and spaced from said socket-shaped portion thereof, said plurality of hydraulic cylinders being mounted on said annular ring in a fixed relationship to said pipe extension section.

8. The connector as claimed in claim 5, wherein said actuating means further includes:
a cylindrical shell member concentrically encircling said pipe extension section and said circumferentially disposed hydraulic cylinders, one end of said shell member fixed to the rearwardly facing end of said collet actuating sleeve and adapted for axial movement therewith with respect to said socket coupling member, the other end of said shell member terminating in a free end extending rearwardly of said annular ring and supported thereon.

9. The connector as claimed in claim 5, wherein said coefficient of friction between said spherical surface of said retaining flange and said rearward facing spherical surface portion of said ball member is increased substantially in excess of 0.25.

10. The connector as claimed in claim 6, wherein said plurality of hydraulically actuated cylinders are interconnected for actuation in two groups, the actuation of either group of cylinders being sufficient to apply said predetermined actuating force to said collet actuating sleeve.

11. The connector as claimed in claim 1, wherein said limited degree of misalignment between the two pipes is in excess of $\pm 1°$.

12. A collet actuated ball and socket connector operable by an independent force applying means capable of applying a predetermined axial force thereto for rigidly interconnecting the ends of two pipes, comprising:
a ball coupling member adapted for connection at one end thereof to the end of one of the pipes and having a free end thereof that terminates in a ball-shaped portion defining concentric forward and rearward facing spherical outer surface portions,
a retaining flange freely disposed about said ball coupling member and having an internal surface portion for mating engagement with said rearward facing spherical outer surface portion of said ball-shaped coupling member, the rearward end portion of said flange having an inclined shoulder on the rearward edge facing outwardly from said ball coupling member,
flange retaining means mounted on said ball coupling member for maintaining said retaining flange in initial concentric and rotating mating engagement with said ball-shaped coupling member,
a socket coupling member including a cylindrical pipe extension section adapted for connection at one end thereof to the end of the other of the two pipes and having a free end thereof that terminates in a socket-shaped portion for accepting the ball-shaped coupling member in general mating engagement therewith,
a metal sealing ring disposed in an annular recess within said socket-shaped portion of said socket coupling member for sealingly mating with said forwardly facing spherical outer surface portion of said ball coupling member, and
collet locking means adapted for cooperation with the independent force applying means mounted about the outer periphery of said socket coupling member and extending axially forward therefrom for permitting insertion of said ball coupling member and retaining flange into mating engagement with said socket coupling member when said collet locking means is open, and engaging said inclined shoulder of said retaining flange for securing said flange and mating ball member in said socket member when said collet locking means is closed to permit a limited degree of axial misalignment between the two pipes,
said collet locking means cooperating with the applied predetermined axial force for multiplying said predetermined axial force applied through said collet locking means and said retaining flange into a known force applied to said rearwardly flange into a known force applied to said rearwardly facing spherical outer surface portion of said ball coupling member for further multiplying said known force and driving said forwardly facing spherical outer surface portion of said ball coupling member into contact with said metal sealing ring to cause sealing deformation thereof against said ball coupling member, said known force applied between said retaining flange and said rearwardly facing spherical outer surface portion of said ball member also cooperating with the coefficient of friction therebetween for generating frictional forces sufficient to lock said ball coupling member rigidly into said socket coupling member for preventing relative motion therebetween.

13. The connector as claimed in claim 12, wherein said collet locking means comprises:
a plurality of elongated collet locking members having a generally inverse trapezoidal-shaped cross-section and distributed in an closely-spaced relationship about the outer periphery of said socket coupling member to form a ring-like collet assembly, each of said collet locking members cooperating with said socket coupling member for permitting limited pivotal movement of said collet locking members with respect to said socket coupling member, the forward extending end of each of said collet locking members having an inwardly facing inclined shoulder for mating engagement with said outwardly facing inclined shoulder of said retaining flange when said collet locking members are pivoted to a closed position, and a collet actuating sleeve adapted for cooperating with the independent force applying means and disposed about and engaging said ring-like assembly of collet locking members and adapted for limited axial sliding movement with respect thereto, said sleeve having a forward end portion having a generally wedge-shaped axial cross-section for cooperating with the outer surface of said plurality of collet locking members for camming said members pivotally inwardly to a closed position when said sleeve is moved axially toward the forward extending ends of said collet locking members and pivoting said collet locking members outwardly to an open position when said sleeve is moved axially rearward with respect to said collet locking members.

14. The connector as claimed in claim 13, wherein said collet locking members further comprise a radially inwardly projecting lug engaging an annular recess disposed about the outer periphery of said socket coupling member and cooperating therewith for permitting said limited pivotal movement of said collet locking members with respect to said socket coupling member.

15. The connector as claimed in claim 13, wherein the mating interfaces between said collet actuating sleeve and the outer surface of said collet locking members, said collet locking members forwardly facing inclined shoulder and the retaining flange rearwardly facing inclined shoulder, said retaining flange inner spherical surface and the rearwardly facing spherical surface of the ball member, and said ball member forwardly facing spherical surface and the metal sealing ring cooperate to multiply said predetermined axial actuating force into said known force capable of effecting said metal-to-metal seal and ridgily locking said ball member with respect to said coupling member.

16. The connector as claimed in claim 13, wherein said mating surfaces of said ball coupling member and said retaining flange are treated to increase the coefficient of friction therebetween.

17. The connector as claimed in claim 16, wherein said coefficient of friction between said spherical surface of said retaining flange and said rearward facing spherical surface portion of said ball member is increased substantially in excess of 0.25.

18. The connector as claimed in claim 12, wherein said limited degree of misalignment between the two pipes is in excess of ±1°.

* * * * *